Feb. 12, 1929.　　　　　J. HELSTROM　　　　　1,702,004
DIRIGIBLE HEADLIGHT
Filed March 27, 1925　　2 Sheets-Sheet 1
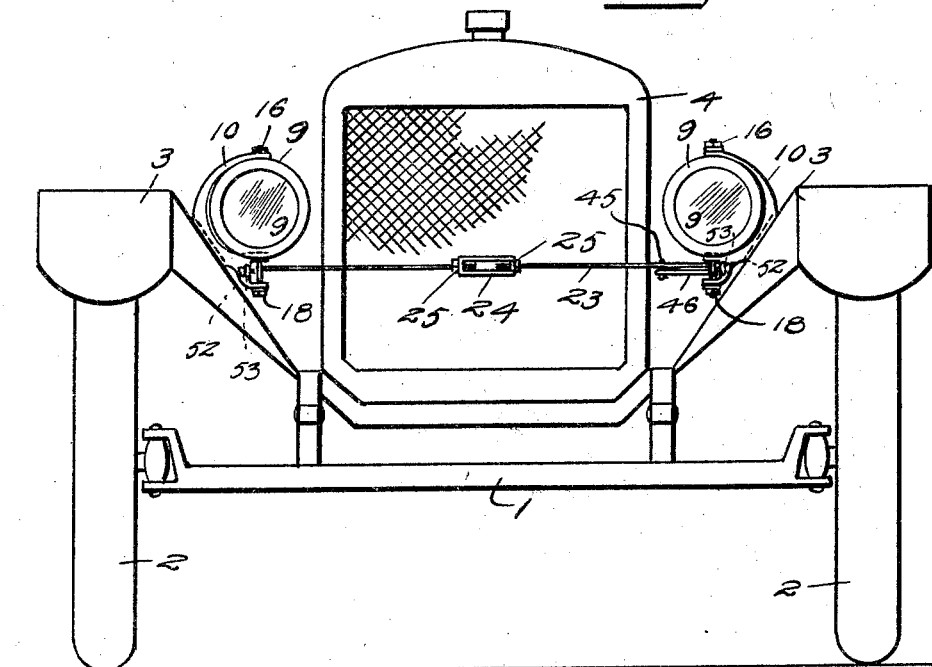
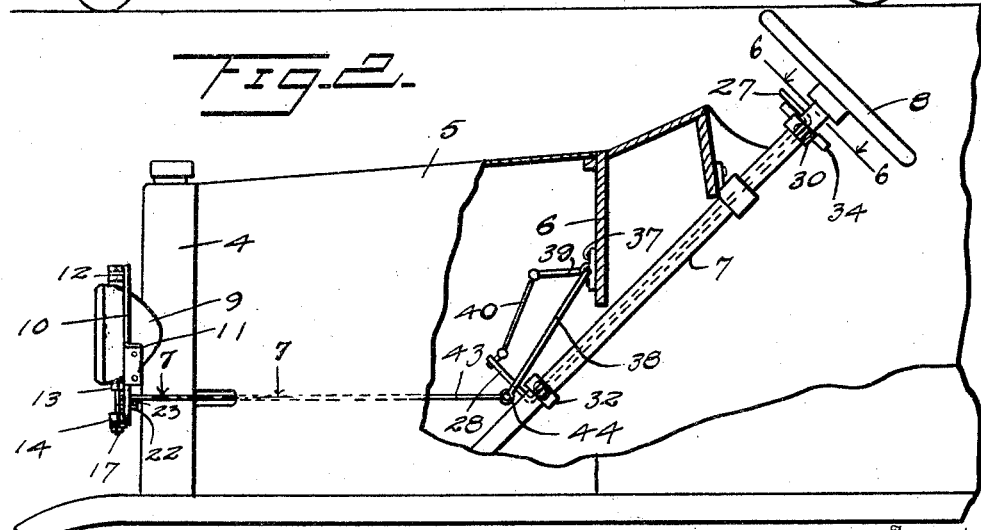
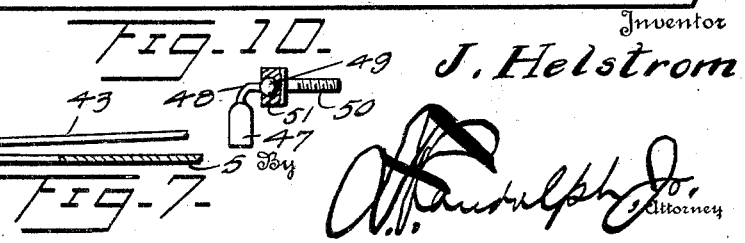
Inventor
J. Helstrom Feb. 12, 1929.                    J. HELSTROM                    1,702,004
                              DIRIGIBLE HEADLIGHT
                          Filed March 27, 1925        2 Sheets-Sheet 2
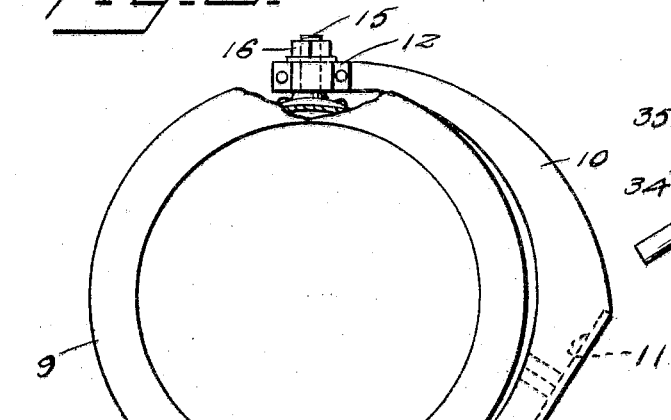
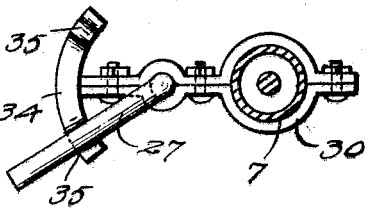
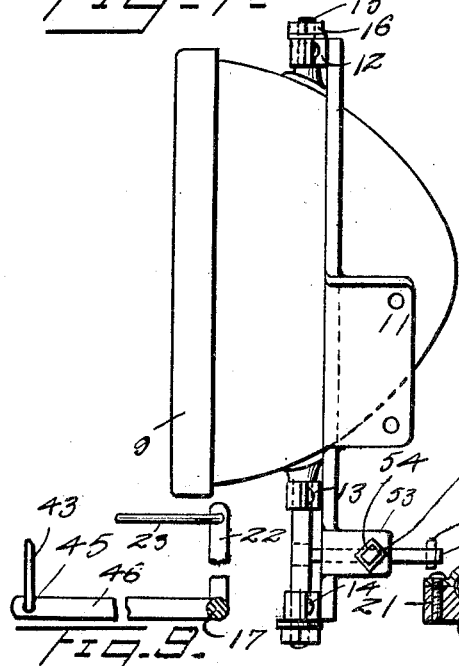
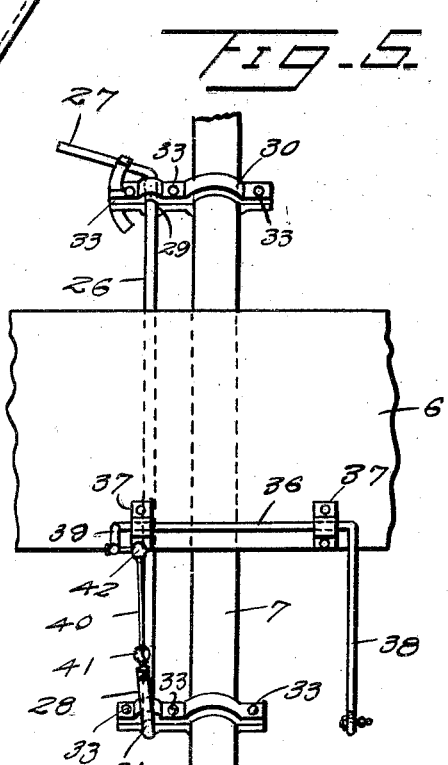
Inventor
J. Helstrom
Attorney Patented Feb. 12, 1929.

1,702,004

UNITED STATES PATENT OFFICE.

JULMER HELSTROM, OF VIRGINIA, MINNESOTA.

DIRIGIBLE HEADLIGHT.

Application filed March 27, 1925. Serial No. 18,816.

This invention relates to automobile headlights, and has for one of its objects the provision of novel, simple and inexpensive supporting and actuating means for headlights of this character which will permit them to be turned to the left in order that the headlights of approaching automobiles will not interfere with the visions of the drivers of the automobiles and at the same time illuminate the road for a distance sufficient to prevent the possibility of collision or the possibility of driving off of the road.

With the above and other objects in view, the invention consists of the construction, combination and arrangement of parts hereinafter fully described and claimed, and illustrated in the accompanying drawings, wherein:

Figure 1 is an elevational view of the front of an automobile having headlights embodying my invention, Figure 2 is a side view partly in elevation and partly in vertical section of the front portion of the automobile, Figure 3 is a view in front elevation of one of the headlights and supporting bracket, Figure 4 is a view in side elevation of one of the headlights and supporting bracket, Figure 5 is a view in front elevation of a portion of the headlight actuating mechanism, Figure 6 is a detail sectional view taken on the plane indicated by the line 6—6 of Figure 2, Figure 7 is a detail sectional view taken on the plane indicated by the line 7—7 of Figure 2, Figure 8 is a detail sectional view taken on the plane indicated by the line 8—8 of Figure 3, Figure 9 is a detail sectional view taken on the plane indicated by the line 9—9 of Figure 3, and Figure 10 is a detail sectional view of one of the ball and socket joints by which certain parts of the device are connected together.

Corresponding and like parts are referred to in the following description, and designated in the several views of the accompanying drawings, by similar reference characters.

In the drawings 1 designates the front axle, 2 the front wheels, 3 the front fenders, 4 the radiator, 5 the engine hood, 6 the cowl board, 7 the steering column, and 8 the steering wheel of an automobile of any make or design.

The headlights 9 of the automobile are rotatably supported by arcuate brackets 10. The brackets 10 are provided with inclined flanges 11 in order to permit them to be secured to the front fenders 3 in the manner shown in Figure 1, and they are each provided with an upper bearing 12 and relatively spaced lower bearings 13 and 14. Stub shafts 15 which are secured to the upper sides of the headlights 9 are journaled in the bearings 12 and are provided with retaining nuts 16. Similar shafts 17 which are secured to the lower sides of the headlights 9 are journaled in the bearings 13 and 14 and are provided with retaining nuts 18. The bearings 12, 13 and 14 are similar, and each includes a removable cap 20 to permit the ready application or removal of the headlights 9 to or from the brackets 10, the caps being secured in place by screws 21. Each shaft 17 is provided with a rearwardly directed arm 22 which are located between the bearings 13 and 14 and which are connected together by a rod 23 in order to cause a uniform turning movement of the headlights 9. The rod 23 is of sectional formation and the contiguous ends thereof are connected together by a turn buckle 24 to permit a relative adjustment of the headlights 9. Nuts 25 mounted in the rod 23 and contacting with the ends thereof prevent causal rotation of the turn buckle 24.

A shaft 26 provided at its upper end with a hand lever 27 and at its lower end with an upwardly extending crank 28, is arranged in parallel relation to the steering column 7, and is journaled in the bearing 29 of a bracket 30 and the bearing 31 of a bracket 32 secured to the steering column 7. The brackets 30 and 32 are of sectional formation to permit them to be readily applied to the steering column 7 and to permit the shaft 26 to be readily mounted in their bearings, and the sections thereof are connected together by bolts 33. The bracket 30 which is arranged in close proximity to the steering wheel 8 is provided with an arcuate and preferably resilient catch 34. Adjacent its ends, the catch 34 is provided with depressions 35 for the reception of the hand lever 27. When the hand lever 27 is in one of the depressions 35 it holds the headlights 9 in normal position, while when it is in the other depression it holds the headlights 9 in their turned or adjusted position. A horizontal shaft 36 is journaled in bearings 37 secured to the front side of the board 6, and is provided at one end with a downwardly extending arm 38 and at the other end with a forwardly extending arm 39, the arm 38 being longer than the arm 39. A link 40 is connected at its lower end to the crank 28 of the shaft 26 by a ball and socket joint 41, and is connected at its upper end to the arm 29 of the shaft 36 by a ball and socket joint 42. A rod 43 is connected to the lower end of the arm 38 of the shaft 36 by a ball and socket joint 44, and has its other end pivotally connected as at 45 to an arm 46 which is secured to one of the shafts 17 and which extends from said shaft at right angles to the arm 22 thereof. The ball and socket joints 41, 42 and 44 are similar, and as shown in Figure 10 each comprises a sleeve 47 provided with an angular stem 48 terminally provided with a spherical head 49. Each joint also comprises a threaded stem 50 provided with a socketed head 51 for the reception of the spherical head 49. The sleeve 47 is threadedly connected to one part and the stem 50 threadedly connected to the other, and in view thereof any play in the various parts of the device may be taken up by adjusting the sleeves 47 and the stems 50 with respect to the parts to which they are secured.

When the shaft 26 is rocked in one direction the headlights 9 will be turned to the right and when rocked in the reverse direction they will be returned to their normal position. The headlights 9 will be held turned to the right or in their normal position by reason of the hand lever 27 engaging in one or the other of the notches or depressions 35 of the catch 34. Set screws 52 carried by lugs 53 on the brackets 10 and secured in adjusted position by lock nuts 54, are arranged in alinement with the arms 22 of the shafts 17, and cooperate with said arms to limit the turning movement of the headlights 9 in both directions.

From the foregoing description, taken in connection with the accompanying drawings, the advantages of the construction and of the method of operation of the invention will be readily apparent to those skilled in the art to which the invention appertains. While I have described the principle of operation of the invention, together with the device which I now consider to be the best embodiment thereof, I desire to have it understood that the device shown is merely illustrative, and that such changes may be made therein when desired as are within the scope of the invention as claimed.

What is claimed is:—

The combination with the headlights of an automobile, means rotatably supporting the headlights, means connecting the headlights for simultaneous rotation, an arm extending rearwardly from one of the headlights, a shaft arranged in parallel relation to and rotatably mounted on the steering column of the automobile and provided at its upper end with a hand lever and at its lower end with an upwardly extending crank, a horizontal shaft rotatably supported in advance of said first shaft and rearwardly of and above the crank of said shaft, said horizontal shaft being provided at one end with a forwardly extending short arm and at the other with a long arm extending downwardly and forwardly to a point below the crank of said first shaft, a link connected to the crank of said first shaft and to the forwardly extending arm of the horizontal shaft, and a rod connected to the downwardly extending arm of the horizontal shaft and to the arm connected to one of the headlights.

In testimony whereof I affix my signature.

JULMER HELSTROM.